G. W. COLLIN.
GAGE COCK.
APPLICATION FILED AUG. 8, 1907.
911,379. Patented Feb. 2, 1909.
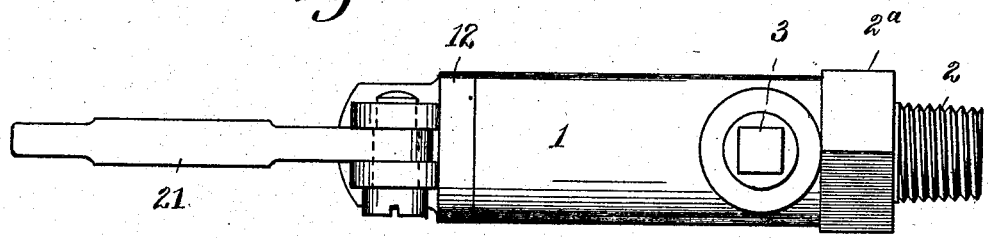
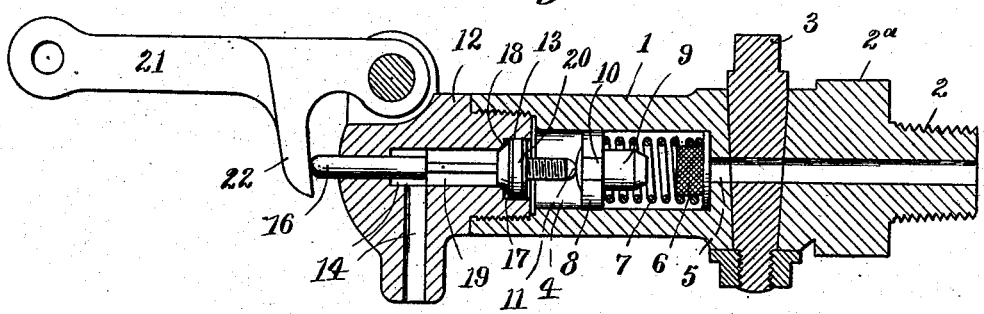
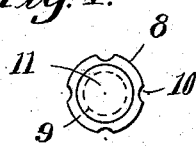
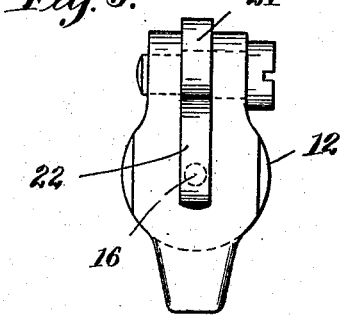
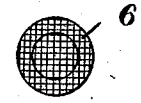
WITNESSES
INVENTOR
George W. Collin
BY
Chamberlain & Newman
ATTORNEYS

UNITED STATES PATENT OFFICE.

GEORGE W. COLLIN, OF MANSFIELD, OHIO.

GAGE-COCK.

No. 911,379.   Specification of Letters Patent.   Patented Feb. 2, 1909.

Application filed August 3, 1907. Serial No. 387,703.

*To all whom it may concern:*

Be it known that I, GEORGE W. COLLIN, a citizen of the United States, and resident of Mansfield, in the county of Richland and State of Ohio, have invented certain new and useful Improvements in Gage-Cocks, of which the following is a specification.

This invention has relation to gage cocks for boilers and the like, and it consists in the novel construction and arrangement of its parts as hereinafter shown and described.

The object of the invention is to provide a gage cock with a valve of peculiar construction which is adapted to effectually close the outlet port of the cock and which is of the kind known in the art as a dry nose gage cock.

The parts of the cock are of simple construction and so arranged that the stress is centrally applied to the valve whereby it is squarely forced against the seat preventing wire drawing of steam and minor leakage.

In the accompanying drawing,—Figure 1, is a plan view of my improved gage cock. Fig. 2, is a central longitudinal sectional view of the same. Fig. 3, is a front end view of the same. Fig. 4, is an end elevation of a hub used in the cock, and Fig. 5, is a side elevation of a screen used in the cock.

The cock consists of a cylindrical casing 1 which is provided with a threaded bushing or boss 2 that is adapted to be screwed into a boiler or water column, by the attachment of a wrench to the shouldered portion $2^a$. The casing 1 is provided with an ordinary plug cock 3 which is adapted to be moved so as to establish communication through the casing or interrupt communication therethrough. The casing 1 is provided with a chamber 4 which is entered at one end by the port 5; the screen 6 is located over the end of the port 5 and is held in place by the coiled spring 7, which surrounds the said screen and bears against the flanged edge thereof. While in operation the screen 6 serves to catch and retain sediment, scale, and other foreign matter and protect the valve 18 and its parts from such objectionable particles. The opposite end of the said spring 7 bears against the flange 8 of the hub 9, and the said spring is under tension to normally hold the hub 9 away from the screen 6 and to hold the said screen at its edge in close contact with the end of the chamber 4. The periphery of the flange 8 is scalloped as at 10, and the end of the hub 9 is rounded, as at 11.

A head 12 is screwed into the end of the casing 1 and closes the end of the chamber 4. Said head is provided at its inner end with a circular cylinder 13, which is located in alinement with the longitudinal axis of the chamber 4 and which communicates with the outlet port 14 that passes through the head 12. The valve 18 is carried upon a stem 16, which has its sole bearing in the head 12, and projects from its front side. The piston 17 of the valve 18 fits snugly within the cylinder 13; that is to say, the said piston is adapted to slide or reciprocate in the said cylinder 13, while its beveled edge rests upon a beveled seat surrounding the port 14 in head 12, and the shank of the valve 18 is of the usual cruciform configuration, as at 19. The valve is chambered entirely within the head 12 which insures the perfect alinement and seating of the valve in operation. The piston is provided in its side with an annular groove 20, which is located substantially midway between the ends of the cylindrical portion of the said head to form a water packing groove. The lever 21 is fulcrumed to the head 12 and is provided with an arm 22 which bears against the outer end of the valve stem 16. The inner end of the valve stem 16 is rounded, as shown, and bears directly against the rounded portion 11 of the hub.

When the coiled spring, such as 7 is employed to assist in closing a reciprocating valve it is practically impossible to have the spring so positioned as to exert a tension squarely upon the valve, for the spring will be under a greater tension at one side than at another. In order to overcome this disadvantage I have provided the hub 9 with a rounded portion 11 which coöperates with the rounded end of the valve stem in transmitting the tension or movement from the spring to the valve 18, whereby the said hub may tilt or cant under the tension of the spring, but the pressure will be transmitted central of the valve 18, through the before mentioned stem to insure its perfect seating. Thus I provide mechanism whereby a coiled spring may be employed without subjecting the valve to this disadvantage prevalent in the use of such springs. At the same time the coiled spring is used for holding the perforated screen over the end of the inlet port 5.

The operation of the valve is as follows: When it is desired to open the gage cock the lever 21 is swung and through the arm 22 the valve stem 16 is moved longitudinally, and the piston 17 of the valve 18 is moved out of the cylinder 13 and the hub 9 is moved toward the screen 6. Thus communication is established between the port 5 and the outlet port 14. When the lever 21 is released the tension of the spring 7 comes into play and also the pressure of steam and water against the piston 17 of the valve 18 to close the same. The said valve and the piston 17 is forced back into the cylinder 13, and the valve of the piston 17 is seated against the bevel inner end of the outlet port 14 while the piston closes the cylinder. In the closing of the valve in this way it will be seen that by reason of the piston entering the cylinder before the valve is seated the main flow of steam is cut off, and the pressure thus removed from the valve proper, allowing the valve to seat more perfectly. If it is desired to repair or clean the interior mechanism of the gage cock the plug cock 3 is closed, when the head 12 may be unscrewed from the casing 1 and the parts may be removed repaired and replaced. Prior to again assembling the interior mechanism the plug cock 3 may be opened and the casing 1 thoroughly cleansed by blowing off.

What is claimed is:—

1. A valve having a cylinder with a communicating port, a reciprocating valve operating in the cylinder, a piston having a grooved periphery and a rounded stem, a hub having a rounded portion engaging said rounded stem, and a coiled spring interposed between a fixed portion of the valve casing and said hub.

2. A valve having a cylinder with a communicating port, a reciprocating valve slidably operating in said cylinder, a piston having a grooved periphery the stem of said piston being rounded, a hub having a rounded portion operating against said rounded stem, a casing for the valve having an inlet port, a screen located over said inlet port, and a coiled spring interposed between said screen and said hub.

3. In a valve as described, a casing having an inlet and an outlet port, a reciprocating valve for closing the outlet port having a rounded stem, a hub located within the casing and having a rounded portion engaging the rounded stem, and a coiled spring interposed between the casing and said hub.

4. In a valve as described, consisting of a casing having an inlet and an outlet port, a reciprocating valve for closing the outlet port having a rounded stem, a screen located over the inlet port, a hub located within the casing and having a rounded portion engaging the rounded stem, and a coiled spring interposed between said screen and said hub.

5. A valve, comprising a casing having a threaded end for attachment to a boiler, a separable head threaded to engage the casing and having a cylinder therein and a port leading therethrough, a stem bearing a valve and piston all operatively mounted within the head, and means for operating the piston and valve to open and close the same.

6. A valve as described, consisting of a casing having a threaded end for attachment to a boiler, and a longitudinal passage therethrough, a plug cock located in said passage, a screen situated over the said passage from the cock, a head detachably connected to the casing and having a cylinder therein communicating with the said passage and a port leading therefrom, a reciprocating valve operating within the cylinder and adapted to close the outlet port, a winged stem attached to the valve and having its bearing within the head, and means for operating the stem and valve in a manner to open and close the latter.

Signed at Mansfield, in the county of Richland, and State of Ohio this 29th day of July, A. D., 1907.

GEORGE W. COLLIN.

Witnesses:
J. ROWLAND BROWN,
P. J. KELLEY.